(12) United States Patent
Hassan et al.

(10) Patent No.: US 7,842,184 B2
(45) Date of Patent: Nov. 30, 2010

(54) PROCESS FOR WATER TREATMENT USING HIGH SHEAR DEVICE

(75) Inventors: Abbas Hassan, Sugar Land, TX (US); Ebrahim Bagherzadeh, Sugar Land, TX (US); Rayford G. Anthony, College Station, TX (US); Gregory Borsinger, Chatham, NJ (US); Aziz Hassan, Sugar Land, TX (US)

(73) Assignee: H R D Corporation, Houston, TX (US)

( * ) Notice: Subject to any disclaimer, the term of this patent is extended or adjusted under 35 U.S.C. 154(b) by 0 days.

(21) Appl. No.: 12/142,447

(22) Filed: Jun. 19, 2008

(65) Prior Publication Data
US 2009/0001017 A1    Jan. 1, 2009

Related U.S. Application Data

(60) Provisional application No. 60/946,462, filed on Jun. 27, 2007.

(51) Int. Cl.
*B01D 21/01* (2006.01)
*B01D 35/00* (2006.01)

(52) U.S. Cl. .................... 210/600; 210/723; 210/754; 210/767; 210/173

(58) Field of Classification Search ......... 210/620–622, 210/150–151, 220, 723–725, 603, 916, 902, 210/753–756, 600, 767, 173
See application file for complete search history.

(56) References Cited

U.S. PATENT DOCUMENTS

| 3,781,320 A | | 12/1973 | Irwin |
| 4,179,375 A | * | 12/1979 | Smith .................. 210/197 |
| 4,544,489 A | * | 10/1985 | Campbell et al. ........... 210/709 |
| 4,724,269 A | | 2/1988 | Suzki et al. |
| 4,886,905 A | | 12/1989 | Larkins, Jr. |

(Continued)

FOREIGN PATENT DOCUMENTS

EP    1604969 A    12/2005

(Continued)

OTHER PUBLICATIONS

U.S. Appl. No. 60/862,904, filed Oct. 25, 2007 (cited in USP 20080281001 to Wood).*
U.S. Appl. No. 60/862,955, filed Oct. 25, 2007 (cited in USP 20080281001 to Wood).*
Office Action Dated Apr. 20, 2010 for U.S. Appl. No. 12/411,660.
Office Action Dated Apr. 20, 2010 for U.S. Appl. No. 12/427,286.
Office Action Dated Apr. 23, 2010 for U.S. Appl. No. 12/568,155.

(Continued)

*Primary Examiner*—Chester T Barry
(74) *Attorney, Agent, or Firm*—Conley Rose, P.C.

(57) ABSTRACT

A method for removing contaminant from feedwater by forming a dispersion comprising bubbles of a treatment gas in a continuous phase comprising feedwater, wherein the bubbles have a mean diameter of less than about 5 μm and wherein the treatment gas is selected from air, oxygen, and chlorine. A method for removing contaminants from a feedwater by subjecting a fluid mixture comprising feedwater and a treatment gas to a shear rate greater than 20,000 $s^{-1}$ in a high shear device to produce a dispersion of treatment gas in a continuous phase of the feedwater. A system for treating feedwater to remove contaminants therefrom is also presented, the system comprising at least one high shear mixing device comprising at least one generator comprising a rotor and a stator separated by a shear gap; and a pump configured for delivering feedwater and treatment gas to the high shear mixing device.

20 Claims, 2 Drawing Sheets

U.S. PATENT DOCUMENTS

| | | | |
|---|---|---|---|
| 4,914,029 A | | 4/1990 | Caransa et al. |
| 4,950,831 A | | 8/1990 | Staton et al. |
| 4,959,183 A | * | 9/1990 | Jameson .................... 261/87 |
| 5,009,816 A | | 4/1991 | Weise et al. |
| 5,194,145 A | * | 3/1993 | Schoendorfer ............... 210/90 |
| 5,264,087 A | | 11/1993 | Lowery et al. |
| 5,382,358 A | | 1/1995 | Yeh |
| 5,451,348 A | | 9/1995 | Kingsley |
| 5,522,553 A | * | 6/1996 | LeClair et al. .............. 241/21 |
| 5,710,355 A | | 1/1998 | Krishnamurti |
| 5,730,784 A | * | 3/1998 | Smith et al. .................. 95/181 |
| 5,756,714 A | | 5/1998 | Antrim et al. |
| 5,877,350 A | | 3/1999 | Langer et al. |
| 5,972,661 A | * | 10/1999 | Kubera et al. .............. 435/104 |
| 6,194,625 B1 | | 2/2001 | Graves et al. |
| 6,251,289 B1 | | 6/2001 | Sherman |
| 6,368,366 B1 | | 4/2002 | Langer et al. |
| 6,368,367 B1 | | 4/2002 | Langer et al. |
| 6,383,237 B1 | | 5/2002 | Langer et al. |
| 6,568,900 B2 | * | 5/2003 | Conrad et al. ............... 415/90 |
| 6,693,213 B1 | | 2/2004 | Kolena et al. |
| 6,768,021 B2 | | 7/2004 | Horan et al. |
| 6,787,036 B2 | | 9/2004 | Long |
| 6,809,217 B1 | | 10/2004 | Colley et al. |
| 7,037,433 B2 | * | 5/2006 | Abu-Orf et al. ............. 210/709 |
| 7,383,723 B2 | * | 6/2008 | Tregub et al. ............. 73/61.71 |
| 2005/0258094 A1 | * | 11/2005 | Chiba ........................ 210/627 |
| 2006/0054205 A1 | * | 3/2006 | Yabe et al. .................. 134/184 |
| 2006/0272634 A1 | | 12/2006 | Nehmer et al. |
| 2007/0095751 A1 | * | 5/2007 | Yamasaki et al. .......... 210/631 |
| 2008/0156727 A1 | * | 7/2008 | Hoage ....................... 210/629 |
| 2008/0281001 A1 | * | 11/2008 | Wood et al. .................... 516/10 |
| 2008/0319320 A1 | * | 12/2008 | Ottoboni et al. ............. 600/458 |
| 2009/0306419 A1 | * | 12/2009 | Myong et al. ............... 554/190 |

FOREIGN PATENT DOCUMENTS

| | | |
|---|---|---|
| JP | 61183235 A | 8/1986 |
| JP | 2000143706 A | 5/2000 |
| JP | 2002003505 A | 1/2002 |
| JP | 2002121353 A | 4/2002 |
| JP | 2007505201 A | 3/2007 |
| WO | 9843725 A | 10/1998 |
| WO | 2005108533 A2 | 11/2005 |
| WO | 2007023864 Y | 3/2007 |

OTHER PUBLICATIONS

Office Action Dated Apr. 27, 2010 for U.S. Appl. No. 12/568,280.
Office Action Dated May 5, 2010 for U.S. Appl. No. 12/142,120.
Office Action Dated Jun. 25, 2009 for U.S. Appl. No. 12/142,447.
Office Action Dated Jan. 7, 2010 for U.S. Appl. No. 12/142,447.
Office Action Dated May 13, 2010 for U.S. Appl. No. 12/142,447.
Office Action Dated Feb. 4, 2010 for U.S. Appl. No. 12/492,721.
Office Action Dated Feb. 18, 2010 for U.S. Appl. No. 12/635,433.
Office Action Dated Feb. 18, 2010 for U.S. Appl. No. 12/635,454.
Office Action Dated May 14, 2010 for U.S. Appl. No. 12/137,441.
Office Action Dated Feb. 19, 2010 for U.S. Appl. No. 12/144,459.
Office Action Dated Sep. 2, 2009 for U.S. Appl. No. 12/142,433.
Office Action Dated Jan. 29, 2010 for U.S. Appl. No. 12/142,433.
Office Action Dated May 24, 2010 for U.S. Appl. No. 12/142,433.
Office Action Dated Apr. 30, 2010 for U.S. Appl. No. 12/141,191.
Office Action Dated Oct. 27, 2009 for U.S. Appl. No. 12/142,120.
Office Action Dated May 5, 2010 for U.S. Appl. No. 12/571,537.

* cited by examiner

PROCESS FOR WATER TREATMENT USING HIGH SHEAR DEVICE

CROSS-REFERENCE TO RELATED APPLICATIONS

This application claims the benefit under 35 U.S.C. §119 (e) of U.S. Provisional Patent Application No. 60/946,462 entitled "High Shear Water Treatment Process," filed Jun. 27, 2007 the disclosure of which is hereby incorporated herein by reference.

STATEMENT REGARDING FEDERALLY SPONSORED RESEARCH OR DEVELOPMENT

Not Applicable.

BACKGROUND OF THE INVENTION

1. Technical Field

The present invention relates generally to water treatment. More particularly, the present invention relates to a high shear system and process for water treatment. The disclosed system and method may be used to treat waste or raw water containing contaminants whereby the water may be disinfected, stabilized and/or contaminant(s) separated from the water.

2. Background of the Invention

Processes for the recovery of waste water from industrial operations present challenging environmental issues and the government regulates these processes. The impact on the environment of waste water used in industrial operations has led to governmental regulations at both the local and federal level. These regulations mandate cleanup of industrial waste water prior to release to the environment and/or introduction into public sewer systems.

Several challenges to cleanup are presented by industrial and residential waste waters. For example, the waste water often comprises significant amounts of suspended solids, undesirable dissolved minerals, and noxious gases. The waste water may also comprise significant amounts of organic materials, including hydrocarbons (e.g., oils) and bacteria.

Furthermore, raw water from surface sources (e.g. springs) or groundwater sources often require treatment for contaminant removal prior to use, e.g. prior to use as drinking water.

Numerous water treatment schemes exist. For example, chemical oxidation processes are routinely used to remove organic contaminants from waste water. Physical waste water treatment systems, including solid particle flocculation/flotation, are also common. However, there remains a need in the industry for improved systems and processes for treating waste water whereby increased throughput, increased contaminant removal, and/or the use of reduced amounts of treatment aid (e.g. gases such as chlorine and air or liquids such as flocculants) are permitted.

SUMMARY

A high shear system and a high shear process for enhancing water treatment are disclosed. The high shear system and process may reduce mass transfer limitations relative to conventional water treatment systems and processes, thereby increasing the water treatment rate and potentially permitting a reduction in contact time, an increased removal/neutralization of undesirable contaminants, and/or a reduction in treatment aid. The system and process employ an external high shear mechanical device to provide enhanced contact between reactants. In some embodiments, this enhanced contact results in accelerated chemical reactions between multiphase reactants. In an embodiment, the process comprises the use of an external pressurized high shear device to provide for water treatment without the need for large volume vessels in which the water spends high residence times.

Herein disclosed is a method for removing contaminants from feedwater, the method comprising forming a dispersion comprising bubbles of a treatment gas in a continuous phase comprising feedwater, wherein the bubbles have a mean diameter of less than about 5 µm and wherein the treatment gas is a gas selected from air, oxygen, and chlorine. The feedwater may comprise waste water, surface water, groundwater, or a combination thereof. The contaminant may be selected from hydrogen sulfide, hydrocarbons, particulate matter, bacteria, and volatile components. The gas bubbles may have a mean diameter of less than 1 µm, or no more than 400 nm. Forming the dispersion may comprise subjecting a mixture of the treatment gas and the continuous phase to a shear rate of greater than about 20,000 $s^{-1}$. Forming the dispersion may comprise contacting the treatment gas and the continuous phase in a high shear device, wherein the high shear device comprises at least one rotor, and wherein the at least one rotor is rotated at a tip speed of at least 22.9 m/s (4,500 ft/min) during formation of the dispersion. In embodiments, the high shear device produces a local pressure of at least about 1034.2 MPa (150,000 psi) at the tip of the at least one rotor during formation of the dispersion. The energy expenditure of the high shear device during formation of the dispersion may be greater than 1000 W/m$^3$ of fluid. The method may further comprise introducing the dispersion into a vessel and extracting particle-containing water from the vessel. In embodiments, the method further comprises introducing at least a portion of the particle-containing water into a separator. At least a portion of the particle-containing water may be recycled and additional dispersion formed therefrom.

Also disclosed is a method for removing contaminants from a feedwater, the method comprising subjecting a fluid mixture comprising treatment gas and the feedwater to a shear rate greater than 20,000 $s^{-1}$ in a high shear device to produce a dispersion of treatment gas in a continuous phase of the feedwater, wherein the treatment gas is selected from air, oxygen, and chlorine. The method may further comprise introducing the dispersion into a vessel from which an aqueous product is removed and separating particles from the aqueous product. The contaminants may comprise dissolved organic matter, the treatment gas may comprise air or oxygen, the vessel may be an aeration vessel comprising micro-organisms that consume organic matter, and the particles separated from the aqueous product may comprise micro-organisms. At least a portion of the particles may be recycled to the aeration vessel. In embodiments, the treatment gas comprises chlorine. The dispersion may be stable for at least about 15 minutes at atmospheric pressure.

Also disclosed herein is a system for treating feedwater to remove contaminants therefrom, the system comprising at least one high shear mixing device comprising at least one rotor and at least one stator separated by a shear gap, wherein the shear gap is the minimum distance between the at least one rotor and the at least stator, and wherein the high shear mixing device is capable of producing a tip speed of the at least one rotor of greater than 22.9 m/s (4,500 ft/min), and a pump configured for delivering feedwater and treatment gas selected from oxygen, air, and chlorine to the high shear mixing device. The system may further comprise a tank from which treated water is extracted, an inlet of the tank fluidly connected to the outlet of the external high shear device. In embodiments, the at least one high shear mixing device is capable of producing a tip speed at a tip of the at least one rotor of at least 40.1 m/s (7,900 ft/min). The system may comprise at least two high shear mixing devices. The high shear device may comprise at least two generators. The shear rate provided by one generator may be greater than the shear rate provided by another generator.

Certain embodiments of an above-described method or system potentially provide for more optimal time, temperature and pressure conditions than are otherwise possible, and which potentially increase the rate of the water treatment process. Certain embodiments of the above-described methods or systems potentially provide overall cost reduction by operating with reduced residence times, providing increased product per unit of treatment aid consumed, and/or reduced capital and/or operating costs. These and other embodiments and potential advantages will be apparent in the following detailed description and drawings.

BRIEF DESCRIPTION OF THE DRAWINGS

For a more detailed description of the preferred embodiment of the present invention, reference will now be made to the accompanying drawings, wherein.

NOTATION AND NOMENCLATURE

Figure 1:
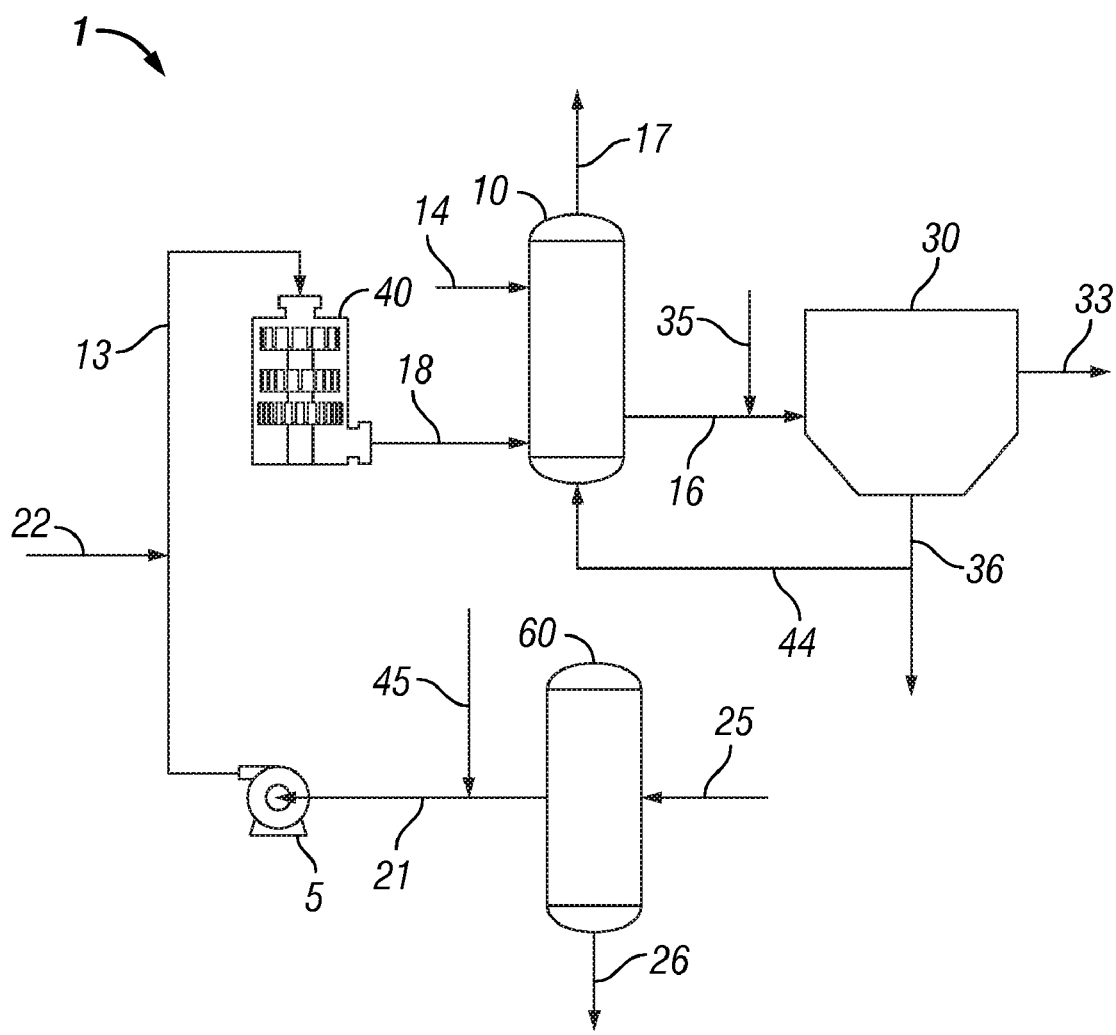
FIG. 1 is a process flow diagram of a water treatment system according to an embodiment of the present disclosure.

As used herein, the term "dispersion" refers to a liquefied mixture that contains at least two distinguishable substances (or "phases") that will not readily mix and dissolve together. As used herein, a "dispersion" comprises a "continuous" phase (or "matrix"), which holds therein discontinuous droplets, bubbles, and/or particles of the other phase or substance. The term dispersion may thus refer to foams comprising gas bubbles suspended in a liquid continuous phase, emulsions in which droplets of a first liquid are dispersed throughout a continuous phase comprising a second liquid with which the first liquid is immiscible, and continuous liquid phases throughout which solid particles are distributed. As used herein, the term "dispersion" encompasses continuous liquid phases throughout which gas bubbles are distributed, continuous liquid phases throughout which solid particles (e.g., solid catalyst or contaminant) are distributed, continuous phases of a first liquid throughout which droplets of a second liquid that is substantially insoluble in the continuous phase are distributed, and liquid phases throughout which any one or a combination of solid particles, immiscible liquid droplets, and gas bubbles are distributed. Hence, a dispersion can exist as a homogeneous mixture in some cases (e.g., liquid/liquid phase), or as a heterogeneous mixture (e.g., gas/liquid, solid/liquid, or gas/solid/liquid), depending on the nature of the materials selected for combination. The term emulsion will be used herein more specifically to refer to liquid/liquid or liquid/liquid/solid dispersions.

The term "treatment aid" will be used to refer to any component added to a contaminated water stream. For example, in embodiments, a "treatment aid" may comprise a treatment gas such as air, oxygen, or chlorine gas. In other embodiments, "treatment aid" may comprise a liquid such as a liquid flocculating agent.

DETAILED DESCRIPTION

Overview. The rate of chemical reactions involving liquids, gases and solids depend on time of contact, temperature, and pressure. In cases where it is desirable to react two or more raw materials of different phases (e.g. solid and liquid; liquid and gas; solid, liquid and gas), one of the limiting factors controlling the rate of reaction involves the contact time of the reactants. In the case of heterogeneously catalyzed reactions there is the additional rate limiting factor of having the reacted products removed from the surface of the catalyst to permit the catalyst to catalyze further reactants. Contact time for the reactants and/or catalyst is often controlled by mixing which provides contact with two or more reactants involved in a chemical reaction. In the case of homogeneous reactions, for example liquid/liquid reactions, enhanced mixing may increase the rate or extent of interaction and also homogenize the temperature within the reaction zone(s).

A system and process for water treatment comprises an external high shear mechanical device to provide rapid contact and mixing of chemical ingredients in a controlled environment in the reactor/mixer device. The disclosed high shear system and method may be incorporated into conventional water treatment processes, thereby enhancing removal or neutralization of contaminant (e.g., hydrocarbon, bacteria, noxious gas, etc.) and/or aeration rate. The high shear device may be used various water treatment processes, such as biological treatment processes that remove dissolved organic material from the water, physical separation processes, and chemical treatment processes. The use of high shear may reduce mass transfer limitations on the desired reactions/interactions and thus reduce the time required for water treatment, thereby increasing obtainable throughput. Product yield may be increased as a result of the high shear system and process. The use of high shear contacting of treatment aid and water to be treated may allow for the use of decreased amounts of gas (e.g. air, chlorine) and/or liquid (e.g. liquid flocculating agents) treatment aids than conventional water treatment processes.

The high shear system may be used to form a dispersion of a treatment gas in a liquid, for example, a dispersion of oxygen, air, or chlorine in the water to be treated. Such a dispersion may enhance the amount of dissolved gas due to the reduced diameter of the bubbles in the dispersion, which typically have a mean bubble diameter of less than about 5 µm. Although not discussed in detail herein, the high shear system may also be used to intimately mix two liquid streams, for example, a water stream to be treated and a liquid flocculating agent. In these embodiments, the high shear device may increase the flocculation of contaminants by effecting intimate mixing within interaction zone(s).

Other uses of the disclosed system and method will become apparent upon reading the disclosure and viewing the accompanying drawings. While the following description will be given with respect to wastewater treatment processes comprising chlorination and aeration, the embodiments described herein are exemplary only, and are not intended to be limiting. For example, the high shear system and process may be used for the treatment of waste water or raw water and may be used for enhancing chlorination and aeration singularly, or any combination of gas and/or liquid injection known to those of skill in the art to be used in the treatment of water streams.

Water Treatment System. A high shear water treatment system will now be described in relation to FIG. 1, which is a process flow diagram of an embodiment of a high shear water treatment system 1 for treatment of water comprising at least one contaminant to be at least partially removed, stabilized, and/or neutralized. Such a system 1 may be used for aeration in a biological or biochemical waste water treatment system according to the activated sludge system or aeration in an aerobic aeration pond/lagoon. In embodiments, high shear system 1 is used to generate air bubbles in a physical waste water treatment system (e.g. solid particle flotation system). The high shear system and process may also be utilized for the bactericidal treatment of water with, for example chlorine gas.

It is widely known that chlorine can be effectively used to kill bacteria contained in water. Chlorine is commonly used for treating drinking water, and also for treating water used in swimming pool systems, and it is has been extensively used to treat waste water during sewage treatment processes. While the addition of chlorine to water has been found to be an effective method of killing bacteria contained in the water, it has a number of disadvantages. Firstly, chlorine, which is a relatively volatile gas in its natural state, is rapidly dissipated from water when left to stand open to the atmosphere, particularly when the water has a temperature of greater than about 70° F. It is thus generally necessary to make frequent additions of chlorine to water under these conditions in order to maintain the bacteria levels in the water within safe ranges. This may be economically undesirable. As discussed further below, the high shear system and process may permit a reduction in the amount of chlorine needed for water treatment and/or increase the rate of water treatment by minimizing resistance to mass transfer via high shear mixing and creation of a dispersion of disinfectant gas in a continuous aqueous phase.

The basic components of a representative high shear system include an external high shear mixing device (HSD), a vessel, and a pump. Each of these components is further described in more detail below. As shown in FIG. 1, high shear device 40 is located external to vessel/reactor 10. Line 21 is connected to pump 5 for introducing water to be treated. Line 13 connects pump 5 to HSD 40, and line 18 connects HSD 40 to vessel 10. Line 22 may be connected to line 13 for introducing a treatment gas (e.g., air, oxygen, or chlorine) or liquid treatment aid. Alternatively, line 22 may be connected to an inlet of HSD 40. Line 17 may be connected to vessel 10 for removal of unreacted treatment gas, hydrogen sulfide or other gas removed from the water by the treatment. Additional components or process steps may be incorporated between vessel 10 and HSD 40, or ahead of pump 5 or HSD 40, if desired, as will become apparent upon reading the description of the high shear water treatment process described hereinbelow.

High shear system 1 may further comprise preliminary treatment apparatus, such as unit 60 which may be used to remove large solids and greases from the water to be treated in line 25. Pretreatment unit 60 may be connected to pump 5 via line 21. High shear system 1 may further comprise a separator 30 downstream of HSD 40 for separation of solids-heavy and solids-reduced products. Separator 30 may be connected via line 16 to vessel 10. Line 33 or line 36 from separator 30 may be connected to line 21 or line 13 to provide for multi-pass operation, if desired. Inlet lines may be incorporated into high shear system 1 for introducing material into the system. For example, line 14 may be connected to vessel 10 for the introduction of material, such as pH adjustment aid, into vessel 10; and line 35 may be connected to line 16 or elsewhere in high shear system 1 to introduce material, such as flocculant into high shear system 1. It should be noted that FIG. 1 is a simplified process diagram and potential pieces of process equipment, such as separators, valves, and compressors, have been omitted for clarity.

Pretreatment Unit(s). High shear system 1 may comprise pretreatment unit(s) 60 for physical separation of components from the water to be treated. Pretreatment unit 60 may be configured to separate large solid objects and/or grease from the water stream in line 25. Without limitation, examples of suitable pretreatment apparatus are bar screens, grit tanks, and settling tanks.

High Shear Mixing Device. External high shear mixing device (HSD) 40, also sometimes referred to as a high shear device or high shear mixing device, is configured for receiving an inlet stream, via line 13, comprising water to be treated and treatment aid. Alternatively, HSD 40 may be configured for receiving water and treatment aid via separate inlet lines (not shown). Although one high shear device 40 is shown in FIG. 1, it should be understood that some embodiments of the system may have one or more than two high shear mixing devices arranged either in series or parallel flow. HSD 40 is a mechanical device that utilizes one or more generators comprising a rotor/stator combination, each of which has a gap between the stator and rotor. The gap between the rotor and the stator in each generator set may be fixed or may be adjustable. HSD 40 is configured in such a way that it is capable of producing submicron and micron-sized bubbles or droplets of treatment aid in an aqueous mixture flowing through the high shear device. The high shear device comprises an enclosure or housing so that the pressure and temperature of the aqueous mixture may be controlled.

High shear mixing devices are generally divided into three general classes, based upon their ability to mix fluids. Mixing is the process of reducing the size of particles or inhomogeneous species within the fluid. One metric for the degree or thoroughness of mixing is the energy density per unit volume that the mixing device generates to disrupt the fluid particles. The classes are distinguished based on delivered energy densities. Three classes of industrial mixers having sufficient energy density to consistently produce mixtures or emulsions with particle sizes in the range of submicron to 50 microns include homogenization valve systems, colloid mills and high speed mixers. In the first class of high energy devices, referred to as homogenization valve systems, fluid to be processed is pumped under very high pressure through a narrow-gap valve into a lower pressure environment. The pressure gradients across the valve and the resulting turbulence and cavitation act to break-up any particles in the fluid. These valve systems are most commonly used in milk homogenization and can yield average particle sizes in the submicron to about 1 micron range.

At the opposite end of the energy density spectrum is the third class of devices referred to as low energy devices. These systems usually have paddles or fluid rotors that turn at high speed in a reservoir of fluid to be processed, which in many of the more common applications is a food product. These low energy systems are customarily used when average particle sizes of greater than 20 microns are acceptable in the processed fluid.

Between the low energy devices and homogenization valve systems, in terms of the mixing energy density delivered to the fluid, are colloid mills and other high speed rotor-stator devices, which are classified as intermediate energy devices. A typical colloid mill configuration includes a conical or disk rotor that is separated from a complementary, liquid-cooled stator by a closely-controlled rotor-stator gap, which is commonly between 0.02 mm to 10 mm (0.001-0.40 inch). Rotors are usually driven by an electric motor through a direct drive or belt mechanism. As the rotor rotates at high rates, it pumps fluid between the rotor and the stator, and shear forces generated in the gap process the fluid. Many colloid mills with proper adjustment achieve average particle sizes of 0.1-25 microns in the processed fluid. These capabilities render colloid mills appropriate for a variety of applications including colloid and oil/water-based emulsion processing such as that required for cosmetics, mayonnaise, or silicone/silver amalgam formation, to roofing-tar mixing.

Tip speed is the circumferential distance traveled by the tip of the rotor per unit of time. Tip speed is thus a function of the rotor diameter and the rotational frequency. Tip speed (in meters per minute, for example) may be calculated by multiplying the circumferential distance transcribed by the rotor tip, $2\pi R$, where R is the radius of the rotor (meters, for example) times the frequency of revolution (for example revolutions per minute, rpm). A colloid mill, for example, may have a tip speed in excess of 22.9 m/s (4500 ft/min) and may exceed 40 m/s (7900 ft/min). For the purpose of this disclosure, the term 'high shear' refers to mechanical rotor stator devices (e.g., colloid mills or rotor-stator dispersers) that are capable of tip speeds in excess of 5.1 m/s. (1000 ft/min) and require an external mechanically driven power device to drive energy into the stream of products to be reacted. For example, in HSD 40, a tip speed in excess of 22.9 m/s (4500 ft/min) is achievable, and may exceed 40 m/s (7900 ft/min). In some embodiments, HSD 40 is capable of delivering at least 300 L/h at a tip speed of at least 22.9 m/s (4500 ft/min). The power consumption may be about 1.5 kW. HSD 40 combines high tip speed with a very small shear gap to produce significant shear on the material being processed. The amount of shear will be dependent on the viscosity of the fluid. Accordingly, a local region of elevated pressure and temperature is created at the tip of the rotor during operation of the high shear device. In some cases the locally elevated pressure is about 1034.2 MPa (150,000 psi). In some cases the locally elevated temperature is about 500° C. In some cases, these local pressure and temperature elevations may persist for nano or pico seconds.

An approximation of energy input into the fluid (kW/L/min) can be estimated by measuring the motor energy (kW) and fluid output (L/min). As mentioned above, tip speed is the velocity (ft/min or m/s) associated with the end of the one or more revolving elements that is creating the mechanical force applied to the fluid. In embodiments, the energy expenditure of HSD 40 is greater than 1000 W/m$^3$. In embodiments, the energy expenditure of HSD 40 is in the range of from about 3000 W/m$^3$ to about 7500 W/m$^3$.

The shear rate is the tip speed divided by the shear gap width (minimal clearance between the rotor and stator). The shear rate generated in HSD 40 may be in the greater than 20,000 s$^{-1}$. In some embodiments the shear rate is at least 40,000 s$^{-1}$. In some embodiments the shear rate is at least 100,000 s$^{-1}$. In some embodiments the shear rate is at least 500,000 s$^{-1}$. In some embodiments the shear rate is at least 1,000,000 s$^{-1}$. In some embodiments the shear rate is at least 1,600,000 s$^{-1}$. In embodiments, the shear rate generated by HSD 40 is in the range of from 20,000 s$^{-1}$ to 100,000 s$^{-1}$. For example, in one application the rotor tip speed is about 40 m/s (7900 ft/min) and the shear gap width is 0.025 mm (0.001 inch), producing a shear rate of 1,600,000 s$^{-1}$. In another application the rotor tip speed is about 22.9 m/s (4500 ft/min) and the shear gap width is 0.0254 mm (0.001 inch), producing a shear rate of about 901,600 s$^{-1}$.

HSD 40 is capable of highly dispersing or transporting treatment aid into a main liquid phase (continuous phase) comprising water, with which it would normally be immiscible, at conditions such that at least a portion of the treatment aid reacts/interacts with contaminant in the water. In some embodiments, HSD 40 comprises a colloid mill. Suitable colloidal mills are manufactured by IKA® Works, Inc. Wilmington, N.C. and APV North America, Inc. Wilmington, Mass., for example. In some instances, HSD 40 comprises the Dispax Reactor® of IKA® Works, Inc.

The high shear device comprises at least one revolving element that creates the mechanical force applied to the aqueous mixture. The high shear device comprises at least one stator and at least one rotor separated by a clearance. For example, the rotors may be conical or disk shaped and may be separated from a complementarily-shaped stator. In embodiments, both the rotor and stator comprise a plurality of circumferentially-spaced teeth. In some embodiments, the stator(s) are adjustable to obtain the desired shear gap between the rotor and the stator of each generator (rotor/stator set). Grooves between the teeth of the rotor and/or stator may alternate direction in alternate stages for increased turbulence. Each generator may be driven by any suitable drive system configured for providing the necessary rotation.

In some embodiments, the minimum clearance (shear gap width) between the stator and the rotor is in the range of from about 0.0254 mm (0.001 inch) to about 3.175 mm (0.125 inch). In certain embodiments, the minimum clearance (shear gap width) between the stator and rotor is about 1.5 mm (0.060 inch). In certain configurations, the minimum clearance (shear gap) between the stator and rotor is at least 1.7 mm (0.07 inch). The shear rate produced by the high shear device may vary with longitudinal position along the flow pathway. In some embodiments, the rotor is set to rotate at a speed commensurate with the diameter of the rotor and the desired tip speed. In some embodiments, the high shear device has a fixed clearance (shear gap width) between the stator and rotor. Alternatively, the high shear device has adjustable clearance (shear gap width).

In some embodiments, HSD 40 comprises a single stage dispersing chamber (i.e., a single rotor/stator combination, a single generator). In some embodiments, high shear device 40 is a multiple stage inline disperser and comprises a plurality of generators. In certain embodiments, HSD 40 comprises at least two generators. In other embodiments, high shear device 40 comprises at least 3 high shear generators. In some embodiments, high shear device 40 is a multistage mixer whereby the shear rate (which, as mentioned above, varies proportionately with tip speed and inversely with rotor/stator gap width) varies with longitudinal position along the flow pathway, as further described herein below.

In some embodiments, each stage of the external high shear device has interchangeable mixing tools, offering flexibility. For example, the DR 2000/4 Dispax Reactor® of IKA® Works, Inc. Wilmington, N.C. and APV North America, Inc. Wilmington, Mass., comprises a three stage dispersing module. This module may comprise up to three rotor/stator combinations (generators), with choice of fine, medium, coarse, and super-fine for each stage. This allows for creation of dispersions having a narrow distribution of the desired bubble (e.g., treatment gas bubbles). In some embodiments, each of the stages is operated with super-fine generator. In some embodiments, at least one of the generator sets has a rotor/stator minimum clearance (shear gap width) of greater than about 5 mm (0.2 inch). In alternative embodiments, at least one of the generator sets has a minimum rotor/stator clearance of greater than about 1.7 mm (0.07 inch).

Figure 2:
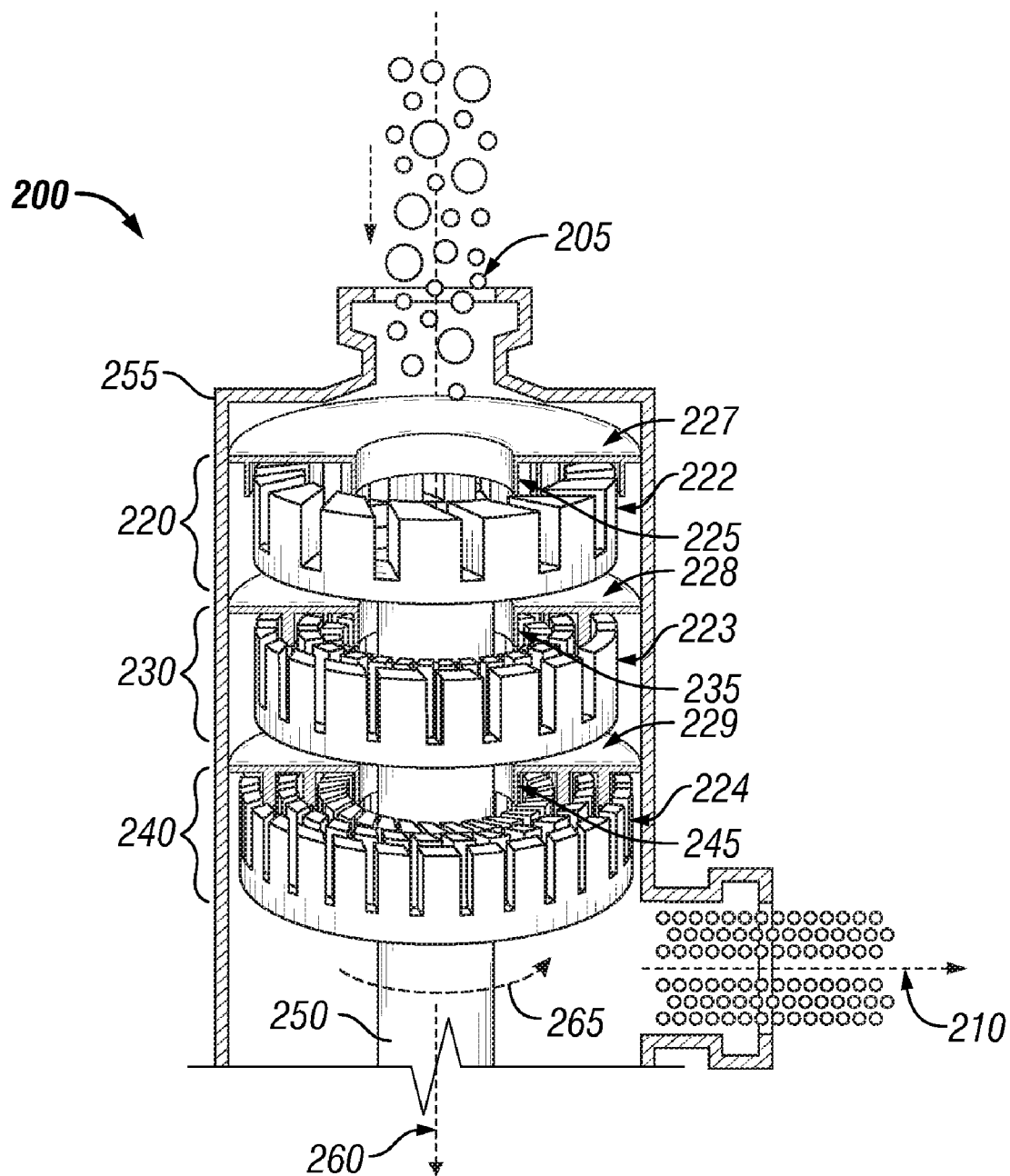
FIG. 2 is a longitudinal cross-section view of a multi-stage high shear device, as employed in an embodiment of the system.

Referring now to FIG. 2, there is presented a longitudinal cross-section of a suitable high shear device 200. High shear device 200 of FIG. 2 is a dispersing device comprising three stages or rotor-stator combinations. High shear device 200 is a dispersing device comprising three stages or rotor-stator combinations, 220, 230, and 240. The rotor-stator combinations may be known as generators 220, 230, 240 or stages without limitation. Three rotor/stator sets or generators 220, 230, and 240 are aligned in series along drive shaft 250.

First generator 220 comprises rotor 222 and stator 227. Second generator 230 comprises rotor 223, and stator 228. Third generator 240 comprises rotor 224 and stator 229. For each generator the rotor is rotatably driven by input 250 and rotates about axis 260 as indicated by arrow 265. The direction of rotation may be opposite that shown by arrow 265 (e.g., clockwise or counterclockwise about axis of rotation 260). Stators 227, 228, and 229 may be fixably coupled to the wall 255 of high shear device 200.

As mentioned hereinabove, each generator has a shear gap width which is the minimum distance between the rotor and the stator. In the embodiment of FIG. 2, first generator 220 comprises a first shear gap 225; second generator 230 comprises a second shear gap 235; and third generator 240 comprises a third shear gap 245. In embodiments, shear gaps 225, 235, 245 have widths in the range of from about 0.025 mm to about 10 mm. Alternatively, the process comprises utilization of a high shear device 200 wherein the gaps 225, 235, 245 have a width in the range of from about 0.5 mm to about 2.5 mm. In certain instances the shear gap width is maintained at about 1.5 mm. Alternatively, the width of shear gaps 225, 235, 245 are different for generators 220, 230, 240. In certain instances, the width of shear gap 225 of first generator 220 is greater than the width of shear gap 235 of second generator 230, which is in turn greater than the width of shear gap 245 of third generator 240. As mentioned above, the generators of each stage may be interchangeable, offering flexibility. High shear device 200 may be configured so that the shear rate will increase stepwise longitudinally along the direction of the flow 260.

Generators 220, 230, and 240 may comprise a coarse, medium, fine, and super-fine characterization. Rotors 222, 223, and 224 and stators 227, 228, and 229 may be toothed designs. Each generator may comprise two or more sets of rotor-stator teeth. In embodiments, rotors 222, 223, and 224 comprise more than 10 rotor teeth circumferentially spaced about the circumference of each rotor. In embodiments, stators 227, 228, and 229 comprise more than ten stator teeth circumferentially spaced about the circumference of each stator. In embodiments, the inner diameter of the rotor is about 12 cm. In embodiments, the diameter of the rotor is about 6 cm. In embodiments, the outer diameter of the stator is about 15 cm. In embodiments, the diameter of the stator is about 6.4 cm. In some embodiments the rotors are 60 mm and the stators are 64 mm in diameter, providing a clearance of about 4 mm. In certain embodiments, each of three stages is operated with a super-fine generator, comprising a shear gap of between about 0.025 mm and about 4 mm. For applications in which solid particles are to be sent through high shear device 40, the appropriate shear gap width (minimum clearance between rotor and stator) may be selected for an appropriate reduction in particle size and increase in particle surface area. In embodiments, this may be beneficial for increasing the flotation of solid particles.

High shear device 200 is configured for receiving from line 13 a mixture at inlet 205. The mixture comprises treatment aid as the dispersible phase and water to be treated as the continuous phase. The feed stream will typically further comprise a particulate solid (e.g. contaminant) component. Feed stream entering inlet 205 is pumped serially through generators 220, 230, and then 240, such that product dispersion is formed. Product dispersion exits high shear device 200 via outlet 210 (and line 18 of FIG. 1). The rotors 222, 223, 224 of each generator rotate at high speed relative to the fixed stators 227, 228, 229, providing a high shear rate. The rotation of the rotors pumps fluid, such as the feed stream entering inlet 205, outwardly through the shear gaps (and, if present, through the spaces between the rotor teeth and the spaces between the stator teeth), creating a localized high shear condition. High shear forces exerted on fluid in shear gaps 225, 235, and 245 (and, when present, in the gaps between the rotor teeth and the stator teeth) through which fluid flows process the fluid and create product dispersion. Product dispersion exits high shear device 200 via high shear outlet 210 (and line 18 of FIG. 1).

The product dispersion has an average gas bubble, droplet or particle size of less than about 5 μm. In embodiments, HSD 40 produces a dispersion having a mean bubble, droplet and/or particle size of less than about 1.5 μm. In embodiments, HSD 40 produces a dispersion having a mean bubble, droplet and/or particle size of less than 1 μm; preferably the bubbles, droplets or particles of treatment aid are sub-micron in diameter. In certain instances, the average bubble, droplet or particle size is from about 0.1 μm to about 1.0 μm. In embodiments, HSD 40 produces a dispersion having a mean bubble, droplet or particle size of less than 400 nm. In embodiments, HSD 40 produces a dispersion having a mean bubble, droplet or particle size of less than 100 nm. High shear device 40 produces a dispersion comprising droplets, particles and/or gas bubbles capable of remaining dispersed at atmospheric pressure for at least about 15 minutes.

Not to be limited by theory, it is known in emulsion chemistry that sub-micron particles, or bubbles, dispersed in a liquid undergo movement primarily through Brownian motion effects. The bubbles in the product dispersion created by high shear device 200 may have greater mobility through boundary layers of solid contaminant particles, thereby facilitating and accelerating the reaction/interaction through enhanced transport of reactants.

In certain instances, high shear device 200 comprises a Dispax Reactor® of IKA® Works, Inc. Wilmington, N.C. and APV North America, Inc. Wilmington, Mass. Several models are available having various inlet/outlet connections, horsepower, tip speeds, output rpm, and flow rate. Selection of the high shear device will depend on throughput requirements and desired particle, droplet or bubble size in dispersion in line 18 (FIG. 1) exiting outlet 210 of high shear device 200. IKA® model DR 2000/4, for example, comprises a belt drive, 4M generator, PTFE sealing ring, inlet flange 25.4 mm (1 inch) sanitary clamp, outlet flange 19 mm (¾ inch) sanitary clamp, 2 HP power, output speed of 7900 rpm, flow capacity (water) approximately 300-700 L/h (depending on generator), a tip speed of from 9.4-41 m/s (1850 ft/min to 8070 ft/min).

Vessel. Vessel or reactor 10 is any type of vessel in which water treatment can propagate. For instance, a continuous or semi-continuous stirred tank reactor, or one or more batch reactors may be employed in series or in parallel. In some applications vessel 10 may be a clarifier or other type of separator. In embodiments, vessel 10 is an aeration tank. Any number of reactor inlet lines is envisioned, with two shown in FIG. 1 (lines 14 and 18). Inlet line 14 may be an alkaline inlet line connected to vessel 10 for introducing pH adjustment aid during operation of the system. Vessel 10 may comprise an exit line 17 for vent gas, and an outlet product line 16 for an aqueous stream. In embodiments, vessel 10 comprises a plurality of reactor product lines 16; for example, if vessel 10 is a separator, the vessel may comprise an outlet for solids and an outlet for clarified water.

Treatment (e.g. aeration or chlorination) will occur whenever suitable time, temperature and pressure conditions exist. In this sense interaction of contaminant and treatment aid, for example chemical oxidation, can occur at any point in the flow diagram of FIG. 1 if contact is suitable. In embodiments, significant reaction (e.g. chlorination) may occur within HSD 40 and a discrete vessel 10 may be unnecessary. That is, in some applications vessel 10 may be omitted. For example, if multiple high shear devices/reactors are employed in series or if HSD 40 is used to aerate water prior to introduction into an aerated lagoon, as further described below, vessel 10 may be absent. In such instances, product from HSD 40 may be introduced directly into a separator 30 or an aerated lagoon or pond. The size of reactor 10 may vary considerably, depending upon the equipment and the amount of waste material to be processed therein.

Vessel 10 may include one or more of the following components: stirring system, heating and/or cooling capabilities, pressure measurement instrumentation, temperature measurement instrumentation, one or more injection points, and level regulator (not shown), as are known in the art of reaction vessel design. For example, a stirring system may include a motor driven mixer. A heating and/or cooling apparatus may comprise, for example, a heat exchanger.

Pumps. Pump 5 is configured for either continuous or semi-continuous operation, and may be any suitable pumping device that is capable of providing controlled flow through HSD 40 and high shear system 1. In embodiments, the system is operated at or near atmospheric pressure. Pump 5 may be configured to provide greater than 202.65 kPa (2 atm) pressure or greater than 303.975 kPa (3 atm) pressure. For example, a Roper Type 1 gear pump, Roper Pump Company (Commerce Ga.) Dayton Pressure Booster Pump Model 2P372E, Dayton Electric Co (Niles, Ill.) is one suitable pump. Preferably, all contact parts of the pump comprise stainless steel, for example, 316 stainless steel. In some embodiments of the system, pump 5 is capable of pressures greater than about 2026.5 kPa (20 atm). In addition to pump 5, one or more additional pumps (not shown) may be included in the system illustrated in FIG. 1. For example, a booster pump, which may be similar to pump 5, may be included between HSD 40 and vessel 10 for boosting the pressure into vessel 10, or a recycle pump may be positioned on line 17 for recycling gas from vessel 10 to HSD 40. As another example, a supplemental feed pump, which may be similar to pump 5, may be included for introducing additional material into vessel 10.

Separator. Separator 30 is any suitable vessel which may be configured to separate treated water from solid contaminant. Separator 30 may be, for example, a clarifier. In embodiments, treated water is removed from below floated solids in separator 30 via line 36, while, in other embodiments, treated water is extracted via line 33 from above solids which have been allowed to settle to a lower portion of separator 30.

Water Treatment Process. Operation of high shear water treatment system 1 will now be discussed with reference to aeration and chlorination.

Feedstream. Line 25 comprises water to be treated. Feedstream in line 25 may be waste material, such as sewage or septic waste waters of a small community or of a factory. In embodiments, feedwater comprises waste material from other sources, such as a municipal treatment system, a waste discharge system from an industrial plant or food processing installation, etc. In embodiments, a portion of the water in high shear system inlet line 21 comprises water recycled via line 45 from separator 30 or vessel 10. In embodiments, the water to be treated comprises raw water, for example, surface water or underground water that may be treated with, for example, chlorination via the disclosed system and process for disinfection of the water prior to its use as drinking water. Such raw surface or underground water may comprise gas such as naturally occurring hydrogen sulfide, gases produced via living organic material such as algae, gases produced via degradation of organic material, residual chlorine, and etc. The water may therefore be aerated, according to embodiments of the present disclosure, to facilitate the release of these gases. Such removal of gases from raw water may ameliorate taste and/or odor problems prior to use of the water as drinking water. In embodiments, the water is aerated and introduced into an aeration vessel 10 comprising microorganisms known to consume oxygen and organic matter in the wastewater.

Pretreatment. In embodiments, waste water enters a pretreatment device 60 via inlet line 25. For example, pretreatment device 60 may comprise a bar screen, grit tank, settling tank, or filtration subsystem, as known to those of skill in the art. Pretreatment device 60 may comprise, for example, a bag filter. Pretreatment unit 60 may be configured to remove grease and/or large solids such as metal components from water in line 25. Pretreatment discharge in line 26 comprises material that is not to be incorporated in the water in line 21 that is processed in HSD 40.

Dispersion Formation. Line 21 introduces water to be treated into pump 5. A dispersible gaseous treatment aid comprising air, oxygen, or chlorine or a dispersible liquid treatment aid is introduced into system 1 via line 22, and combined in line 13 with the aqueous stream to be treated. In embodiments, dispersible gas in line 22 comprises oxygen. In embodiments, dispersible gas in line 22 comprises chlorine. In embodiments, dispersible gas in line 22 comprises air. In embodiments, line 22 comprises dispersible liquid treatment aid (e.g. flocculant).

In embodiments, the dispersible treatment aid is fed directly into HSD 40, instead of being combined with the liquid feedwater stream in line 13. Pump 5 may be operated to pump the liquid feedwater through line 21, may build pressure and feed HSD 40, and may provide a controlled flow throughout high shear device (HSD) 40 and high shear system 1. In some embodiments, pump 5 increases the pressure of the HSD inlet stream to greater than 200 kPa (2 atm) or greater than about 300 kPa (3 atmospheres). In this way, high shear system 1 may combine high shear with pressure to enhance intimate mixing of water and treatment aid.

After pumping, the dispersible treatment aid and the feedwater to be treated are mixed within HSD 40, which serves to create a fine dispersion (which may be, for example, a liquid/liquid emulsion or a gas/liquid dispersion) of the treatment aid in the feedwater. Within HSD 40, the treatment aid and the feedwater are highly dispersed such that nanobubbles (nanodroplets), submicron-sized bubbles (droplets), and/or microbubbles (microdroplets) of the treatment aid are formed for superior dissolution into solution and mixing enhancement. For example, disperser IKA® model DR 2000/4, a high shear, three stage dispersing device configured with three rotors in combination with stators, aligned in series, may be used to create the dispersion of treatment aid in liquid medium comprising feedwater. The rotor/stator sets may be configured as illustrated in FIG. 2, for example. The combined reactants enter the high shear device via line 13 and enter a first stage rotor/stator combination. The rotors and stators of the first stage may have circumferentially spaced first stage rotor teeth and stator teeth, respectively. The coarse dispersion exiting the first stage enters the second rotor/stator stage. The rotor and stator of the second stage may also comprise circumferentially spaced rotor teeth and stator teeth, respectively. The reduced bubble or droplet-size dispersion emerging from the second stage enters the third stage rotor/stator combination, which may comprise a rotor and a stator having rotor teeth and stator teeth, respectively. The dispersion exits the high shear device via line 18. In some embodiments, the shear rate increases stepwise longitudinally along the direction of the flow, 260. For example, in some embodiments, the shear rate in the first rotor/stator stage is greater than the shear rate in subsequent stage(s). In other embodiments, the shear rate is substantially constant along the direction of the flow, with the shear rate in each stage being substantially the same.

If HSD 40 includes a PTFE seal, the seal may be cooled using any suitable technique that is known in the art. For example, the feedwater stream flowing in line 13 or line 21 may be used to cool the seal and in so doing be preheated prior to entering high shear device 40.

The rotor(s) of HSD 40 may be set to rotate at a speed commensurate with the diameter of the rotor and the desired tip speed. As described above, the high shear device (e.g., colloid mill or toothed rim disperser) has either a fixed clearance between the stator and rotor or has adjustable clearance. HSD 40 serves to intimately mix the dispersible treatment aid and the feedwater. In some embodiments of the process, the transport resistance of the reactants is reduced by operation of the high shear device such that the velocity of reaction/interaction is increased by greater than about 5%. In some embodiments of the process, the transport resistance of the reactants is reduced by operation of the high shear device such that the velocity of reaction/interaction is increased by greater than a factor of about 5. In some embodiments, the velocity of reaction/interaction is increased by at least a factor of 10. In some embodiments, the velocity is increased by a factor in the range of about 10 to about 100 fold.

In some embodiments, HSD 40 delivers at least 300 L/h at a tip speed of at least 4500 ft/min, and which may exceed 7900 ft/min (40 m/s). The power consumption may be about 1.5 kW. Although measurement of instantaneous temperature and pressure at the tip of a rotating shear unit or revolving element in HSD 40 is difficult, it is estimated that the localized temperature seen by the fluid therein is in excess of 500° C. and at pressures in excess of 500 kg/cm$^2$ under cavitation conditions. The high shear mixing results in dispersion of the dispersible treatment aid in micron or submicron-sized bubbles or droplets. In some embodiments, the resultant dispersion has an average bubble or droplet size less than about 1.5 μm. Accordingly, the dispersion exiting HSD 40 via line 18 comprises micron and/or submicron-sized droplets or gas bubbles. In some embodiments, the mean bubble or droplet size is in the range of about 0.4 μm to about 1.5 μm. In some embodiments, the resultant dispersion has an average bubble or droplet size less than 1 μm. In some embodiments, the mean bubble or droplet size is less than about 400 nm, and may be about 100 nm in some cases. In many embodiments, the dispersion is able to remain dispersed at atmospheric pressure for at least 15 minutes.

Once dispersed, the resulting gas/liquid/solid or liquid/liquid/solid dispersion exits HSD 40 via line 18 and feeds into vessel 10, as illustrated in FIG. 1.

Aeration. In instances where high shear system 1 is used for aeration, dispersion in line 18 comprises oxygen or air dispersed in the water. The aeration may be used for physical wastewater treatment or biological wastewater treatment utilizing micro-organisms that consume oxygen.

In a waste water treatment system according to the activated sludge process, a continuous culture of mixed microorganisms is maintained in the presence of dissolved oxygen using organic substances contained in the waste water as a culture medium. The organic substances are oxidized and separated (e.g. by sedimentation) from a flock of microorganisms or an activated sludge which comprises the medium and mixed microorganisms. The aerobic aerated lagoon process operates based on a similar principle, but does not include feedback of activated sludge.

In the biochemical treatment of waste water, aeration effects dissolution of oxygen contained in the air into the waste water and/or dissipation of unnecessary gas or volatile material contained in the water. Aeration usually accompanies a mixing or agitation of the waste water. The supply of oxygen enables biochemical reactions such as the oxidation of organic substances, growth of microorganisms or self-oxidation by the activated sludge to proceed while mixing and agitation permits a satisfactory suspension of the activated sludge for achieving an efficient contact between absorbed oxygen and the sludge. Aeration may occur within HSD 40 and a vessel 10 into which the dispersion of air/oxygen in wastewater flows and to which activated sludge is fed back. In a lagoon process, aeration may continue in a lagoon in which the waste water dwells for a relatively long period of time. The rates of the biochemical reactions depend on the period of aeration and the quantity of microorganisms and organic materials; such reactions typically proceed at a slow rate as compared with other chemical reactions. Accordingly, larger treatment vessels and an increased space for installation are generally required. The use of high shear device 40 in such an aeration process may serve to increase the rate and/or effectiveness of such aeration processes and may reduce treatment vessel volume requirements or quantities of treatment aid needed for sufficient water treatment.

In embodiments, the high shear system is used to enhance aeration of a water stream. Biochemical Oxygen Demand or Biological Oxygen Demand (BOD) is a chemical procedure used to determine how fast biological organisms use up oxygen in a body of water. BOD may be used to indicate the effectiveness of wastewater treatment. In the high shear aeration process disclosed herein, the oxygen absorption relative to the quantity of oxygen injected, or the oxygen absorption efficiency, may be greatly improved. In embodiments, the BOD is increased utilizing high shear. Consequently, the aeration period required may be reduced, a more compact aeration vessel 10 having a high volume duty designed, or, in some embodiments, a discrete vessel 10 eliminated.

In aeration processes, dispersion comprising air dispersed in a continuous phase of the water to be treated may be introduced into an aeration vessel 10. In embodiments, vessel 10 comprises microorganisms. Alternatively, the dispersion in line 18 may be introduced directly into a pond or lagoon in which microorganisms are present which consume dissolved organic material in the water. In embodiments, physical wastewater treatment using aeration is performed, vessel 10 is absent, and the dispersion comprising oxygen dispersed in water is introduced directly into a separator 30, or an aeration lagoon or pond. Within an aeration lagoon or pond, solids may be allowed to settle from the treated water which may be removed by pumping, evaporation or other conventional water removal technique.

In embodiments utilizing a vessel 10, vessel/reactor 10 may be operated in either continuous or semi-continuous flow mode, or it may be operated in batch mode. The contents of vessel 10 may be maintained at a specified reaction temperature using heating and/or cooling capabilities (e.g., cooling coils) and temperature measurement instrumentation. Pressure in the vessel may be monitored using suitable pressure measurement instrumentation, and the level of reactants in the vessel may be controlled using a level regulator (not shown), employing techniques that are known to those of skill in the art. The contents may be stirred continuously or semi-continuously with a mechanical mixing apparatus, for example. Vessel 10 may be operated at or near room temperature and atmospheric pressure. Vessel 10 may comprise micro-organisms. In such embodiments, the microorganisms consume at least a portion of the dissolved organic matter in the water and consume treatment gas (e.g. oxygen) in the process.

Product gas, such as hydrogen sulfide released in the aeration process, and unconsumed treatment gas may exit vessel 10 via gas line 17. Unreacted treatment gas may be removed from line 17 and recycled to HSD 40 or vessel 10, if desired.

In the embodiment of FIG. 1, water exits vessel 10 by way of line 16. In embodiments, product stream in line 16 comprises water and solids. In embodiments in which vessel 10 comprises micro-organisms, the product in outlet line 16 may further comprise micro-organisms. In embodiments, product in line 16 is introduced into separator 30. Separator 30 may separate treated water from solids. In embodiments, the solids are flocculated and treated water removed from the bottom portion of separator 30. In such embodiments, line 35 may introduce a flocculating agent into line 16 to enhance the flotation of solids above the treated water in separator 30. The flocculating agent may be a conventional flocculant which helps flocculate fine particles so that they more rapidly coalesce and float as a sludge upon the water. It is also envisioned that a high shear device similar to HSD 40 may be used to introduce a liquid (or solid) flocculant.

In other embodiments, product in line 16 is introduced into separator 30, solids are allowed to settle to the bottom of the separator, and treated water is removed via a line 33 from the top portion of separator 30. In embodiments in which vessel 10 and product in line 16 comprise micro-organisms, a portion of the microorganisms separated from the treated water in separator 30 may be recycled to vessel 10 via line 36 (if solids are sedimented within separator 30) or line 33 (if solids are flotated within separator 30) and recycle line 44 to repopulate the micro-organisms in vessel 10. Remaining solids separated from the treated water may be sent to a solids handling system. Treated water produced by aeration as described may be further treated with chemical oxidation as discussed below.

Chemical Oxidation. The high shear system 1 may be used in a chlorine oxidation waste water treatment method. Chemical oxidation may disinfect or stabilize solid particles in the water and produce a substantially water-free sludge. In these applications, dispersible treatment aid in line 22 comprises chlorine gas for chemical oxidation of the wastewater and the product dispersion in line 18 comprises chlorine dispersed in a continuous aqueous phase. A portion of dispersible gas in line 22 may comprise chlorine gas recycled from elsewhere in the system, for example, removed from the gas exiting vessel 10 via gas line 17. The dispersion may be introduced into vessel 10. As a result of the intimate mixing of the reactants prior to entering vessel 10, a significant portion of the chemical oxidation may take place in HSD 40.

Introduction of dispersible gas comprising chlorine into line 22 into the water to be treated produces hypochlorous acid, which produces nascent oxygen and hypochlorite ions. Organic solid particles in the water are oxidized and minute gas bubbles formed, including nitrogen and carbon dioxide, which may adhere to the particles. The reaction between the chlorine gas and the waste water materials produces hydrochloric acid and hypochlorous acid. In the desired (substantially neutral) range of pH, more hypochlorous acid may be formed by the gaseous chlorine than hydrochloric acid. Although hydrochloric acid (HCl) will not oxidize the solid organic particles, it will aid in disinfection. The hypochlorous acid (HOCl) as well as the hypochlorite ion, which is also formed by and with the HOCl, are powerful oxidizers. The pH may be controlled such that a sufficient quantity of strong oxidants is present, particularly hypochlorous acid, which is the most powerful oxidizer present.

The pH of the waste water may be altered via means known to those of skill in the art. For example, subsequent to pretreatment 60, a holding tank may be used to adjust the pH to a level which is close to acid-alkaline neutrality, that is, in the pH range of from about 6.5 to about 7.5 or more preferably in the pH range of from about 6.8 to about 7.0. Waste water is typically at a lower pH than this, and therefore, the addition of sodium hydroxide, lime or the like may be used in high shear system 1 to raise the pH to the desired level. Conversely, if the waste material is too alkaline, the pH may be lowered by adding water at a lower pH or acid. In some embodiments, pH adjustment material is added elsewhere to high shear system 1, for example via reactor inlet line 14 or into line 13. A pH adjustment pretreatment of the raw material introduced via line 21 may permit formation of greater amounts of the more effective oxidants, particularly hypochlorous acid. This may aid in stabilization of the waste solids.

Use of a substantially neutral pH level in a high shear system 1 may thus be desirable for elimination of offensive odors and result in a higher degree of disinfection and/or stabilization of the resulting sludge. The use of high shear device 40 may permit more complete oxidation of the solid waste particles by enhancing contact of the contaminants with oxidant. When the process is operated in the above-mentioned desired pH range, sufficient hypochlorous acid may be formed to effectively disinfect the solid materials, that is, to destroy the pathogens (i.e., the bacteria and viruses, etc.) and to eliminate further bacterial growth.

In an embodiment, waste water material comprising particles of organic solids suspended in water is treated by mixing the feedwater thoroughly with chlorine gas in high shear device 40. Oxidizing reactions between the chlorine and the water stabilize and/or disinfect the otherwise putrescible, unstable solid waste particles. Chlorine gas may be introduced into line 13 or directly into HSD 40. The amount of chlorine introduced into high shear system 1 will vary depending upon the nature of the material being treated, the flow rate, etc. The chlorine dosage may run from 700-3000 mg/L.

The dispersion in line 18 comprising chlorine dispersed in a continuous phase of the water to be treated may be introduced into vessel 10. Within vessel 10, chemical oxidation reactions continue. Vessel/reactor 10 may be operated in either continuous or semi-continuous flow mode, or it may be operated in batch mode. The contents of vessel 10 may be maintained at a specified reaction temperature using heating and/or cooling capabilities (e.g., cooling coils) and temperature measurement instrumentation. Pressure in the vessel may be monitored using suitable pressure measurement instrumentation, and the level of reactants in the vessel may be controlled using a level regulator (not shown), employing techniques that are known to those of skill in the art. The contents may be stirred continuously or semi-continuously with a mechanical mixing apparatus, for example. Vessel 10 may be operated at room temperature and atmospheric pressure. As mentioned above, sodium hydroxide or other alkali may be introduced via inlet line 14 for raising the pH when the pH of the feedwater in line 25 is below a desired value.

Product gas and unconsumed chlorine gas may exit vessel 10 via gas line 17. Unreacted treatment gas may be removed from line 17 and recycled to HSD 40 or vessel 10, if desired. The temperature and pressure of high shear system 1 vary depending on the feedstream, the type of oxidant employed, and the mixing attained in high shear device 40. Reactor 10 may be operated under pressure. Conditions of temperature, pressure, space velocity and chlorine gas ratio which are similar to those used in conventional water treatment may be employed. By way of example, the chemical oxidation may be operated at a pressure in the range of from about 200 kPa (30 psig) to about 310 kPa (45 psig). In embodiments, chemical oxidation occurs at a pressure of about 240 kPa (35 psig). In embodiments, oxidation is carried out at or near room temperature.

In the embodiment of FIG. 1, product exits vessel 10 by way of line 16. In embodiments, product stream in line 16 comprises water and solids. Product in line 16 may be introduced into separator 30. Treated water is separated from solids in separator 30. In embodiments, the solids are flocculated and float as a sludge layer above the water and treated water is removed from the bottom portion of separator 30. In such embodiments, line 35 may introduce a flocculating agent into line 16 to enhance the flotation of the solids above the treated water and the separation in separator 30. In other embodiments, product in line 16 is introduced into separator 30, the solids are allowed to settle to the bottom of separator 30, and treated water is removed via a line 33 from the top portion of separator 30. In embodiments, the treated water is further processed, for example the pH of the treated water may be adjusted. A portion of the treated water may be recycled to HSD 40 via, for example, line 45. Such recycle of treated water may be used to adjust the pH of the water in line 21. Solids separated from the treated water as sludge in separator 30 may be sent for disposal.

The resulting treated solid waste material separated from treated water in separator 30 may be at least about 99% disinfected, alternatively 99.9%. The production of offensive odors may be minimized and/or the sludge separated from the treated water may be sufficiently disinfected or stabilized that it may be used as fertilizer material or may be applied as ground cover. The high shear water treatment system and method may produce a sludge which is equivalent to what is called a "process to further reduce pathogens" (referred to as PFRP) in which substantially all of the bacteria and pathogens within the material are destroyed.

Multiple Pass Operation. In the embodiment shown in FIG. 1, the system is configured for single pass operation, wherein the output 16 from vessel 10 goes directly to further processing for recovery of treated water. In some embodiments it may be desirable to pass the contents of vessel 10, or a liquid fraction thereof, through HSD 40 during a second pass. In this case, line 16, line 33, or line 36 may be connected to line 21 for example via line 45, such that at least a portion of the contents of the line is recycled from vessel 10 or separator 30 and pumped by pump 5 into line 13 and thence into HSD 40. Additional treatment gas may be injected via line 22 into line 13, or it may be added directly into the high shear device (not shown).

Multiple High Shear Mixing Devices. In some embodiments, two or more high shear devices like HSD 40, or configured differently, are aligned in series, and are used to further enhance water treatment. The operation of multiple HSDs may be in either batch or continuous mode. In some instances in which a single pass or "once through" process is desired, the use of multiple high shear devices in series may also be advantageous. In some embodiments where multiple high shear devices are operated in series, vessel 10 may be omitted. For example, in embodiments, outlet dispersion in line 18 may be fed into a second high shear device and subsequently into any number of additional high shear devices or into separator 30 or an aeration pond or lagoon. When multiple high shear devices 40 are operated in series, additional treatment gas may be injected into the inlet feedstream of each device. In some embodiments, multiple high shear devices 40 are operated in parallel, and the outlet dispersions therefrom are introduced into one or more vessels 10. In other embodiments, multiple high shear devices 40 are operated in parallel and the outlet dispersions therefrom are introduced into one or more separators 30, aeration ponds or lagoons.

Features. Without wishing to be limited to a particular theory, it is believed that the level or degree of high shear mixing is sufficient to increase rates of mass transfer and also produces localized non-ideal conditions that enable reaction/interaction to occur that may not otherwise be expected to occur based on Gibbs free energy predictions. Localized non ideal conditions are believed to occur within the high shear device resulting in increased temperatures and pressures with the most significant increase believed to be in localized pressures. The increase in pressures and temperatures within the high shear device are instantaneous and localized and quickly revert back to bulk or average system conditions once exiting the high shear device. In some cases, the high shear mixing device induces cavitation of sufficient intensity to dissociate one or more of the reactants into free radicals, which may intensify a chemical reaction/interaction or permit a reaction to take place at less stringent conditions than might otherwise be required. Cavitation may also increase rates of transport processes by producing local turbulence and liquid microcirculation (acoustic streaming). An overview of the application of cavitation phenomenon in chemical/physical processing applications is provided by Gogate et al., "Cavitation: A technology on the horizon," Current Science 91 (No. 1): 35-46 (2006). The high shear mixing device of certain embodiments of the present system and methods induces cavitation whereby treatment aid and contaminant are dissociated into free radicals, which then interact.

The present methods and systems for water treatment incorporate an external high shear mechanical device for providing rapid contact and mixing of chemical ingredients in a controlled environment in the reactor/high shear device. The high shear device reduces the mass transfer limitations on the reaction/interaction and thus increases the overall reaction/interaction rate, and may allow substantial reaction under global operating conditions under which substantial reaction may not be expected to occur.

In embodiments, use of the disclosed process comprising mixing via external high shear device 40 allows an increase in production (greater throughput) from a process operated without high shear device 40. In embodiments, consumption of treatment gas (e.g., chlorine, oxygen or air) and/or liquid flocculant is reduced when compared to water treatment in the absence of external high shear device 40.

In embodiments, the method and system of this disclosure permit design of a smaller and/or less capital intensive process allowing selection of a reactor 10 (and/or tank 30) having reduced volume than previously possible without the incorporation of external high shear device 40. In embodiments, the disclosed method reduces operating costs/increases production from an existing process. Alternatively, the disclosed method may reduce capital costs for the design of new processes.

Potential benefits of the high shear system include, but are not limited to, faster cycle times, increased throughput, reduced operating costs and/or reduced capital expense due to the possibility of designing smaller vessels. In embodiments, the process of the present disclosure provides for a higher level of contaminant removal during water treatment than conventional water treatment processes comprising an absence of external high shear mixing. In embodiments, the degree of mixing in external high shear device 40 is varied to attain a desired degree of removal of a specific contaminant. In embodiments, the high shear water treatment process of the present disclosure reduces treatment gas (e.g., chlorine, oxygen, air) usage. In embodiments, the use of the present system and method for the water treatment makes economically feasible the use of reduced amounts of chlorine, by increasing the rate of contaminant oxidation, etc.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method for removing contaminants from a feedwater, the method comprising:
   subjecting a fluid mixture comprising treatment gas and the feedwater to a shear rate greater than 20,000 s$^{-1}$ in a high shear device to produce a high shear treated product, wherein the treatment gas comprises chlorine.

2. The method of claim 1 further comprising:
   separating a product gas comprising contaminant, a solid comprising contaminant, or both from the high shear treated product to provide a contaminant-reduced product.

3. The method of claim 2 further comprising maintaining the pH of the high shear treated product in the range of from about 6.5 to about 7.5.

4. The method of claim 3 further comprising recycling at least a portion of the contaminant-reduced product to the feedwater to adjust the pH thereof.

5. The method of claim 2 wherein said solid comprising contaminant is a solid sludge and wherein the method comprises separating the solid sludge from the high shear treated product.

6. The method of claim 5 wherein the sludge is at least 99.9% disinfected.

7. The method of claim 6 further comprising using the sludge as fertilizer, ground cover, or both.

8. The method of claim 5 wherein the sludge is at least 99% disinfected.

9. The method of claim 5 wherein separating the solid sludge from the high shear treated product comprises solids flotation.

10. The method of claim 9 wherein separating the solid sludge from the high shear treated product further comprises introducing a flocculant into the high shear treated product.

11. The method of claim 2 wherein removing the product gas from the high shear treated product reduces offensive odors.

12. The method of claim 11 wherein the product gas removed from the high shear treated product comprises hydrogen sulfide.

13. The method of claim 1 wherein the high shear device comprises at least one generator, wherein the at least one generator comprises a rotor and a complementarily-shaped stator, and wherein subjecting the fluid mixture to a shear rate of at least 20,000 s$^{-1}$ comprises combining the treatment gas and the feedwater and introducing the combination into the high shear device.

14. The method of claim 1 wherein the high shear device comprises at least two generators, wherein each generator comprises a rotor and a complementarily-shaped stator.

15. The method of claim 14 wherein the shear rate provided by one generator is greater than the shear rate provided by at least one other generator.

16. The method of claim 1 wherein the high shear treated product comprises at least one substance selected from the group consisting of hypochlorous acid, hypochlorite ion and hydrochloric acid.

17. The method of claim 1 wherein the chlorine dosage is in the range of from about 700 to about 3000 mg per liter of feedwater.

18. The method of claim 1 wherein the amount of chlorine utilized is less than the amount required in the absence of subjecting the fluid mixture to a shear rate of at least 20,000 s$^{-1}$.

19. The method of claim 1 wherein the feedwater comprises at least substance one selected from the group consisting of waste water, surface water and groundwater.

20. The method of claim 1 comprising subjecting the fluid mixture to a shear rate of at least about 40,000 s$^{-1}$.

* * * * *